United States Patent [19]

Dohrer et al.

[11] Patent Number: 4,780,264
[45] Date of Patent: Oct. 25, 1988

[54] LINEAR LOW DENSITY POLYETHYLENE CAST FILM

[75] Inventors: Kathryn K. Dohrer, Clute; Debra H. Niemann, Angleton, both of Tex.

[73] Assignee: The Dow Chemical Company, Midland, Mich.

[21] Appl. No.: 53,239

[22] Filed: May 22, 1987

[51] Int. Cl.$^4$ .............................................. B29C 47/88
[52] U.S. Cl. .................... 264/556; 264/171; 264/216; 264/237; 425/72.1
[58] Field of Search ............... 264/556, 216, 237, 85, 264/171, 348; 425/72 R, 326.1, 72.1

[56] References Cited

U.S. PATENT DOCUMENTS

| | | | |
|---|---|---|---|
| 4,076,698 | 2/1978 | Anderson | 526/348.6 |
| 4,282,177 | 8/1981 | Kurtz et al. | 264/216 |
| 4,302,566 | 11/1981 | Karol et al. | 526/125 |
| 4,339,507 | 7/1982 | Kurtz et al. | 428/522 |
| 4,348,349 | 9/1982 | Kurtz | 264/216 |
| 4,360,494 | 11/1982 | Kurtz | 264/216 |
| 4,486,377 | 12/1984 | Lucchesi et al. | 264/556 |
| 4,608,221 | 8/1986 | Kurtz et al. | 264/556 |
| 4,612,300 | 9/1986 | Coleman, III | 502/113 |
| 4,668,463 | 5/1987 | Cancio et al. | 264/556 |

FOREIGN PATENT DOCUMENTS

2124139 A  2/1984  United Kingdom .

OTHER PUBLICATIONS

"Reducing Draw Resonance in LLDPE Film Resins" Lucchesi et al., *Plastics Engineering,* 5-1985.
"New Pocesses for the Reduction of Draw Resonance in Melt Embossing and Extrusion Coating", *Antec,* 5-1985.
"Part 1. Newtonian Fluids", *Alche,* vol. 24, No. 3, Hyun, 5-1978.

*Primary Examiner*—Jeffery Thurlow
*Attorney, Agent, or Firm*—Walter J. Lee

[57] ABSTRACT

The draw resonance problems encountered when extrusion casting or extrusion coating linear low density polyethylene, LLDPE, are substantially alleviated by a polymer designed to have an $I_2$ value in the range of about 0.1 to about 25, and an $I_{10}/I_2$ ratio of not more than 8.3, preferably lower than 8.3. Line speeds approaching and even surpassing those attained with LDPE are made possible. This invention can even be used in conjunction with known prior methods for alleviating draw resonance problems with LLDPE and obtain the benefits of the combination. The $I_2$ is measured in accordance with ASTM D-1238-190/2.16 and the $I_{10}$ is measured in accordance with ASTM D-1238-190/10.

28 Claims, No Drawings

LINEAR LOW DENSITY POLYETHYLENE CAST FILM

FIELD OF THE INVENTION

Films of linear low density polyethylene (LLDPE), having high resistance to draw resonance, are cast using fast line speeds.

BACKGROUND OF THE INVENTION

It is known that low density polyethylene (LDPE) made by the high pressure polymerization of ethylene, using a free radical initiator, can be cast into films using fast line speeds. The films so-produced lack sufficient impact strength and tensile properties for many of the applications for which a polymer film is desired. These LDPE polymers are characterized by the presence of long chain-branching along the polymer chains.

Linear low density polyethylene (LLDPE), which is known to be a linear polymer prepared using a coordination catalyst, contains a higher olefin comonomer ($C_3$–$C_{12}$) interpolymerized into the polymer chain, but because of the substantial absence of long chain-branching, the interpolymer exhibits appreciably different properties when molten, and when solid, as compared to LDPE and HDPE. HDPE (a linear high density ethylene homopolymer) is made in substantially the same manner as LLDPE, but without the comonomer; it is the presence of the comonomer in the copolymer which causes the density of LLDPE to be lower than the HDPE homopolymer. In the presently described invention, the density of the LLDPE may be in the same density range as LDPE, or even lower, if enough of a given comonomer is used in the copolymer, or may be in an intermediate range (i.e. about 0.94 to about 0.955 gm/cc) when a lesser amount of the given comonomer is used. These linear polymers are made using a coordination catalyst, such as the Ziegler-type or Phillips-type catalyst, not with a free radical initiator such as used in making LDPE. The LLDPE polymers may be made in substantial accordance with, e.g. U.S. Pat. Nos. 4,302,566 or 4,076,698, especially the latter, so long as the catalyst and/or process conditions used are those which will produce the low ratio of $I_{10}/I_2$ required for the present invention, such as by using the catalyst described in U.S. Pat. No. 4,612,300.

Whereas it is known that LDPE can be cast into films using fast line speeds, it is also known that stronger films are obtained with LLDPE. Persons attempting to cast LLDPE, in order to obtain stronger films, have encountered problems when trying to cast the films at line speeds as fast as that used with LDPE. The problems with using fast line speeds when casting films of LLDPE have been attributed to the lack of resistance to draw resonance.

The expression "draw resonance" or "surging" is defined in, e.g., U.S. Pat. No. 4,339,507 as ". . . a limit cycle corresponding to a sustained periodic oscillation in the velocity and cross-sectional area of a drawing process when the boundary conditions are a fixed velocity at the exit of an extruder and a fixed velocity at the take-off position. It occurs when the draw ratio exceeds a critical value. Draw resonance or surging can be thought of as an instability in take-off phenomenon of a material coming from an extruder, more or less homogeneously. The instability manifests itself in the occurrence of periodic fluctuations in the extrudate dimensions such as film thickness when a critical value of the take-up speed is exceeded. Surging may be so extreme as to actually break a web or film that extrudes from a die and totally shut down an extrusion coating process." The expressions "draw-down", "draw ratio", "melt strength", and "neck-in" are also defined in the patent. The patent discloses that LLDPE suffers from deficiencies in processing which include problems with draw resonance and with high neck-in. The invention claimed in the patent is an extrusion coaiing process which uses a blend of LDPE polymer and LLDPE polymer to obtain the desired extrusion properties.

In U.S. Pat. No. 4,486,377 the draw resonance problem, found in drawing films of LLDPE, is said to be reduced by using a cooling gas between the die and the nip roll.

In an article titled "Reducing Draw Resonance in LLDPE Film Resins" by Peter J. Lucchesi et al, published in *PLASTICS ENGINEERING*, May, 1985, it is reported that LLDPE experiences resonance even at very low draw rates, largely due to its lack of long-chain branching. The article also states that ". . . The only known way to reduce the draw resonance of LLDPE is to cool the extrudate gradually rather than expose it to the shock-cooling of a water bath or chill-roll". The article suggests the use of a "draw resonance eliminator (DRE)" which involves the use of a fluid medium (air) against the molten film between the die and the nip and chill roll.

Authors E. H. Roberts et al in an article titled "New Processes For The Reduction of Draw Resonance in Melt Embossing And Extrusion Coating" published in 1985 in *LAMINATIONS & COATINGS CONFERENCE/TAPPI Proceedings*, also reported on the "Draw Resonance Eliminator (DRE)". The same authors also reported on the same subject in an article published in *ANTEC*, 1985.

In *AIChE Journal* (Vol. 24, No. 3), May 1978, on page 418, there is an article by Jae Chun Hyun titled "Part 1. Newtonian Fluids" which offers theoretical considerations related to draw resonance in melt spinning of fibers and films.

U.K. Patent G.B. No. 2,124,139 (published 2-15-84) discloses that LLDPE, having a propensity for draw resonance at high draw speeds, is drawn into a film using a draw roller located not more than 6 inches from the die so as to have a short draw-gap.

There is a perceived need for other means of avoiding draw resonance problems when extruding LLDPE which avoids having to add other polymers to it and avoids having to apply mechanical changes in the extrusion equipment whereby the drawing process is altered. The present invention substantially fills such need, as described hereinafter. However, if one already has made modifications in a cast film or extrusion coating process or equipment used therefor, or wishes to use a blend of LLDPE with another polymer (such as LDPE and the like), then the present invention can still be used to good advantage in such processes or equipment, or with such blends, and obtain the benefits of the combination of techniques.

SUMMARY OF THE INVENTION

We have now found that LLDPE can be designed to have a high resistance to draw resonance, allowing it to be drawn into films at line speeds previously thought to be unattainable without using additives or by using certain special equipment. This high resistance has, unexpectedly, been attained by designing an LLDPE polymer which has an unusually narrow molecular weight distribution as indicated by an $I_{10}/I_2$ ratio of not greater than 8.3. This permits the extrusion casting and extrusion coating of LLDPE a line speeds approaching, and in some cases surpassing, the line speeds which can be used with LDPE.

Furthermore, when such an LLDPE polymer is used in combination with an additive (such as another polymer) which helps alleviate draw resonance problems, or when used with a draw resonance eliminator (DRE), or when used with a very short draw-gap, (all these known techniques being referred to above), then the benefits of the combination are obtained.

DETAILED DESCRIPTIONS, INCLUDING BEST MODE KNOWN

The properties of the LLDPE of the present invention, which we refer to at times as a fast-draw LLDPE, are usually as follows:

It is a copolymer of ethylene containing from about 1 to about 60%, preferably about 1 to about 40% by weight of at least one higher olefin of $C_3$–$C_{12}$, preferably at least one of those in the range of $C_4$–$C_8$, most especially octene-1; these olefins are represented by the formula $H_2C=CH-R$, where R represents a hydrocarbon moiety containing from 1 to 10 carbon atoms, especially butene, pentene, 4-methyl pentene-1, hexene, or octene, or a mixture of such olefins;

It has a density in the range of about 0.87 to about 0.955 gm/cc, preferably in the range of about 0.88 to 0.950 gm/cc, most preferably about 0.88 to about 0.945 gm/cc (as measured by ASTM D-1248);

It has an $I_2$ value in the range of about 0.1 to about 25, preferably about 1.0 to about 10, most preferably about 1.5 to about 6 (as determined by ASTM D-1238-E, which is the ASTM method used in determining "standard melt flow", a.k.a. as "melt index"); on the other hand, the $I_{10}$ value is determined by using ASTM D-1238-N; D-1238-E is also known as D-1238-190/2.16 and D-1238-N is also known as D-1238-190/10.0.

It is critical, for purposes of this invention, that within the above described $I_2$ range, the LLDPE has an $I_{10}/I_2$ ratio of not more than 8.3, preferably less than 8.0, most preferably less than 7.5, especially less than 7. In this invention, the lower the said ratio at a given $I_2$ value, the better, so far as attaining fast line speeds in extrusion-casting or extrusion-coating is concerned:

It has a narrow molecular weight distribution (MWD) by way of having been prepared using a coordination catalyst which produces narrow molecular weight distribution LLDPE, such as is described in U.S. Pat. No. 4,612,300; the invention is, however, not limited to only those in accordance with U.S. Pat. No. 4,612,300, but any other catalyst and/or process found to produce such narrow MWD may be used. It will be understood that the smaller the $I_{10}/I_2$ ratio, the narrower will be the MWD.

Considering that the cast film market and the extrusion coating market, for which the presently claimed inventive process is especially designed, is currently dominated by LDPE, then some discussion of the differences between LDPE and LLDPE is appropriate here.

LDPE has been used for many years in cast applications and has been found to draw at adequate line speeds for large scale operations. However, it has its deficiencies such as in the more recently designed disposable diapers which employ refastenable tapes. These refastenable tapes require that the polymer film be strong enough to resist tearing when the tape is peeled off; LDPE was found to be deficient in the necessary tensile strength and tear strength. This change in the diapers brought about a need for a polymer film which would have the strength to withstand the peeling off of the tape, yet which would not appreciably slow down the manufacturing process. LLDPE not only is found to have the strength needed to withstand the peeling off of the tape, but we have found that one can obtain fast line speeds when extrusion-casting or extrusion-coating films of LLDPE without encountering the draw resonance problems for which LLDPE is well known in the industry, by using LLDPE polymers designed to have an $I_{10}/I_2$ ratio as described in this disclosure.

It will be understood that the LLDPE polymers which are used in the practice of the present invention will have applications other than in making diapers, and the making of diapers is just one application in which LLDPE can be used to good advantage if the problem of draw resonance is alleviated in order to cast the films at fast line speeds.

As used in this disclosure, the expressions "fast draw" and "fast line speeds" are in reference to the speeds obtainable with LLDPE and indicate speeds which appreciably approach, or even surpass, the speeds obtainable with LDPE using the same extrusion equipment and conditions.

The following examples illustrate some particular embodiments of the present invention, but the invention is not limited to the particular embodiments shown. It will be appreciated by practitioners of these arts that the exact maximum line speeds one can attain with one type of extruder or coater will not necessarily be the same as one may attain with another extruder or coater. For purposes of making useful comparisons of results, one should use the same extruder or coater with all the samples being tested.

In the following Examples 1–3, the temperature settings are summarized in Table II. The equipment consists of an Egan coextrusion cast film line with the identical sample being fed through both extruders. The extruders are a 2.5" 24:1 L/D Egan extruder with a Maddock mixing section and a 3.5" 32:1 L/D Egan extruder, also with a Maddock mixing section. A 30-inch Johnson "coat hanger" die with flex lips is attached. The film contacts two chrome plated chill rolls that have a mirror finish. A CMR 1000 Microprocessor computer is an integral part of the system for control and monitoring the equipment conditions. A Fife Model OSP-2-40 Beta thickness gauge is used to monitor thickness.

Also in the following examples, the LLDPE polymers comprise ethylene interpolymerized with a sufficient amount of octene-1 to produce the density shown for each resin sample. The densities of the LLDPE samples are quite close to each other, which makes comparisons more readily evaluated. The following Table I describes the polymers:

TABLE I

| Resin | $I_2$ | $I_{10}/I_2$ Ratio | Density |
|---|---|---|---|
| A | 2.3 | 6.5 | 0.936 |
| B | 2.5 | 8.3 | 0.934 |
| E | 2.1 | 8.3 | 0.940 |
| F | 2.1 | 8.2 | 0.941 |
| G | 2.1 | 7.4 | 0.941 |

TABLE I-continued

| Resin | $I_2$ | $I_{10}/I_2$ Ratio | Density |
|---|---|---|---|
| H | 2.2 | 7.0 | 0.941 |
| K | 2.2 | 6.6 | 0.941 |
| LDPE* | 1.8 | 10.5 | 0.923 |

*The LDPE is used for comparisons only and does not represent an example of the present invention.

EXAMPLE 1

Resins A and B are tested on the above described equipment. The test consists of increasing the rpm and the line speed concurrently to maintain 1.2 mils (0.03 mm) thickness. The point of draw resonance is determined visually when the web becomes unstable.

TABLE II

| 2.5" Extruder | Temp., °F. | 3.5" Extruder | Temp., °F. |
|---|---|---|---|
| Zone 1 | 350 | Zone 1 | 350 |
| Zones 2-4 | 550 | Zones 2-7 | 550 |
| Adapter/Pipes | 550 | Adapter/Pipes | 550 |
| — | — | Die Temp. | 550 |
| — | — | Chill Roll 1 | 90 |
| — | — | Chill Roll 2 | 60 |

The A sample exhibits a maximum line speed of 1400 fpm and the B sample exhibits a maximum line speed of 800 fpm.

EXAMPLE 2

Another cast film trail is conducted using a greater number of resins, i.e. LLDPE E-K. Table III presents data for samples E-K compared with LDPE.

TABLE III

| | E | F | G | H | K | LDPE* |
|---|---|---|---|---|---|---|
| 2.5" Extruder | | | | | | |
| RPM | 86 | 85 | 93 | 116 | 129 | 153 |
| Amps | 39 | 37 | 42 | 48 | 53 | 34 |
| Press., psi | 41 | 122 | 218 | 199 | 216 | 154 |
| Melt Temp., °F. | 556 | 558 | 554 | 557 | 557 | 553 |
| 3.5" Extruder | | | | | | |
| RPM | 95 | 87 | 94 | 116 | 129 | 151 |
| Amps | 126 | 117 | 134 | 152 | 163 | 103 |
| Press., psi | 880 | 824 | 960 | 1057 | 1115 | 535 |
| Melt Temp., °F. | 502 | 503 | 504 | 508 | 511 | 495 |
| Point of Draw Resonance Line Speed, fpm | 809 | 823 | 886 | 1128 | 1285 | 1279 |

*Not an example of the invention

EXAMPLE 3

Samples E-K, fabricated substantially as above in comparison with LDPE, with the extruder rpm adjusted to maintain a film thickness of 1.2 mils at a line speed of 450 fpm, exhibit significantly greater tensile strength (ASTM D-882) than the LDPE as illustrated in Table IV below.

TABLE IV

| Tensile Tests | E | F | G | H | K | LDPE* |
|---|---|---|---|---|---|---|
| Ultimate Tensile, | | | | | | |
| MD | 6080 | 6000 | 5200 | 5670 | 5000 | 3950 |
| CD | 4170 | 4470 | 3990 | 4480 | 4400 | 2760 |
| Tensile Yield, | | | | | | |
| MD | 2250 | 2460 | 2390 | 2460 | 2380 | 1490 |
| CD | 2450 | 2650 | 2580 | 2700 | 2700 | 1230 |
| % Elongation, | | | | | | |
| MD | 510 | 510 | 500 | 550 | 540 | 340 |
| CD | 760 | 770 | 720 | 740 | 710 | 600 |
| Toughness, | | | | | | |
| MD | 1270 | 1290 | 1150 | 1330 | 1210 | 850 |
| CD | 1510 | 1650 | 1440 | 1590 | 1540 | 900 |

*Not an example of the invention

EXAMPLE 4

Samples A and B are evaluated on a 3.5" Black Clawson Model 435 30:1 L/D extrusion coating equipment with a 150 HP Electro-Flyte drive system; the die is a 30" Black Clawson, Model 300XLHL. The resin is coated onto Kraft paper at a melt temperature of 550° F. and at an RPM of 51. Sample A, which has the narrower $I_{10}/I_2$ ratio also achieves the fastest line speed.

We claim:

1. In a process wherein LLDPE polymer is fabricated into a film by either of an extrusion-casting or an extrusion-coating technique, the improvement whereby greater resistance to draw resonance, and therefore faster line speeds, are attained by employing LLDPE polymer having an $I_{10}/I_2$ ratio of not more than 8.3, said $I_{10}/I_2$ values being measured in accordance with ASTM D-1238,
   wherein the LLDPE polymer consists essentially of ethylene interpolymerized with from about 1% to about 60% by weight of at least one alkene of $C_3$-$C_{12}$ to form an interpolymer having a density in the range of about 0.87 to about 0.955 gm/cc.

2. The process of claim 1 wherein the said ratio is less than about 8.0.

3. The process of claim 1 wherein the said ratio is less than about 7.5.

4. The process of claim 1 wherein the said ratio is less than about 7.0.

5. The process of claim 1 wherein the said LLDPE comprises ethylene interpolymerized with from about 1% to about 60% by weight of at least one alkene of $C_3$-$C_{12}$ to form an interpolymer which has a density in the range of about 0.87 to about 0.955 gm/cc, and an $I_2$ value in the range of about 0.1 to about 25.

6. The process of claim 1 wherein the LLDPE comprises an ethylene interpolymer containing from about 1% to about 40% of at least one comonomer selected from the group represented by the formula $H_2C=CH-R$, where R represents a hydrocarbon moiety containing from 1 to 10 carbon atoms.

7. The process of claim 1 wherein the LLDPE comprises an interpolymer of ethylene with at least one comonomer of the group consisting of butene, 4-methyl pentene-1, hexene, and octene.

8. The process of claim 1 wherein the LLDPE comprises an interpolymer of ethylene and octene.

9. The process of claim 1 wherein the LLDPE has a density in the range of about 0.88 to about 0.950 gm/cc.

10. The process of claim 1 wherein the LLDPE has a density in the range of about 0.88 to about 0.945 gm/cc.

11. The process of claim 1 wherein the LLDPE has an $I_2$ value in the range of about 0.1 to about 25.

12. The process of claim 1 wherein the LLDPE has an $I_2$ value in the range of about 1.0 to about 10.

13. The process of claim 1 wherein the LLDPE has an $I_2$ value in the range of about 1.5 to about 6.

14. The process of claim 1 wherein the claimed technique of obtaining an improvement in resistance to draw resonance and faster line speeds, by using an LLDPE having an $I_{10}/I_2$ ratio of not greater than 8.3, is used in conjunction with at least one of the previously known techniques listed below:
  (a) the use of a draw resonance eliminator known as the DRE;
  (b) the use of a coolant gas which is directed onto the film between the extrusion die and the nip roll as the film is extruded and drawn;
  (c) the use of an extruder wherein the draw roller is located not more than 6 inches from the extrusion die;
  (d) the use of an olefin polymer blended in the LLDPE.

15. In a process wherein LLDPE polymer is fabricated into a film by an extrusion casting or an extrusion coating technique, the improvement whereby faster line speeds are attained by the use of LLDPE polymer which has an $I_2$ value in the range of about 1 to about 25 and an $I_{10}/I_2$ ratio of not more than 8.3,
  said improvement being used in conjunction with at least one of the previously known techniques listed below:
  (a) the use of a draw resonance eliminator known as the DRE;
  (b) the use of an extruder wherein the draw roller is located not more than 6 inches from the extrusion die;
  (c) the use of a coolant gas which is directed onto the film between the extrusion die and the nip roll as the film is extruded and drawn;
  (d) the use of an olefin polymer blended in the LLDPE.

16. The process of claim 15 wherein the LLDPE comprises about 1% to about 60% of at least one olefin of the formula $H_2C=CH-R$, wherein the R represents from 1 to 10 carbon atoms, and
  wherein the density of the LLDPE is in the range of about 0.87 to about 0.955 gm/cc.

17. The process of claim 15 wherein the LLDPE has a density in the range of about 0.88 to about 0.950 gm/cc.

18. The process of claim 15 wherein the LLDPE has a density in the range of about 0.88 to about 0.945 gm/cc.

19. The process of claim 15 wherein the $I_{10}/I_2$ ratio is less than 8.0.

20. The process of claim 15 wherein the said ratio is less than 7.5.

21. The process of claim 15 wherein the said ratio is less than 7.0.

22. The process of claim 15 wherein the LLDPE has an $I_2$ value between about 1.0 and about 10.

23. The process of claim 15 wherein the LLDPE has an $I_2$ value between about 1.5 and about 6.

24. The process of claim 15 wherein the LLDPE comprises ethylene interpolymerized with from about 1% to about 60% of at least one $C_3-C_{12}$ olefin comonomer.

25. The process of claim 15 wherein the LLDPE comprises ethylene interpolymerized with from about 1% to about 40% of at least one $C_3-C_{12}$ olefin.

26. The process of claim 15 wherein the LLDPE comprises ethylene interpolymerized with at least $C_4-C_8$ olefin.

27. The process of claim 15 wherein the LLDPE comprises ethylene interpolymerized with at least one of the group comprising butene, 4-methyl pentene-1, hexene, and octene.

28. The process of claim 15 wherein the LLDPE comprises ethylene interpolymerized with octene.

* * * * *